United States Patent [19]
Berger

[11] 3,740,936
[45] June 26, 1973

[54] LAWN CUTTING DEVICE IN PARTICULAR LAWN EDGE CUTTER

[75] Inventor: Julius Berger, Wuppertal-Cronenberg, Germany

[73] Assignee: Firma Julius Berger, Wuppertal-Cronenberg, Germany

[22] Filed: Nov. 30, 1971

[21] Appl. No.: 203,148

[30] Foreign Application Priority Data
Dec. 1, 1970 Germany................... P 20 58 984.8

[52] U.S. Cl. ............................................. 56/246
[51] Int. Cl. ........................................... A01d 55/00
[58] Field of Search........................ 56/246, 247, 248

[56] References Cited
UNITED STATES PATENTS

| | | |
|---|---|---|
| 451,031 | 4/1891 | Davidson .............................. 56/246 |
| 2,503,348 | 4/1950 | Miller .................................. 56/246 |
| 1,057,015 | 3/1913 | Stover.................................. 56/246 |
| 2,654,985 | 10/1953 | Miller .................................. 56/246 |

Primary Examiner—Russell R. Kinsey
Attorney—Ernest G. Montague

[57] ABSTRACT

A lawn mower comprising an immovable lower cutter and a cooperating swingable upper cutter, and a rotatably driven cylinder. A cam disc disposed integrally in each side of the cylinder and forms undulating control cam pivot planes, off-set relative to each other. Control rollers cooperate with a plate pivoted to the frame driven by the cam discs for oscillating movement. The pivot plate operatively engages the upper cutter for swinging the latter for cutting cooperation with the lower cutter.

10 Claims, 5 Drawing Figures

3,740,936

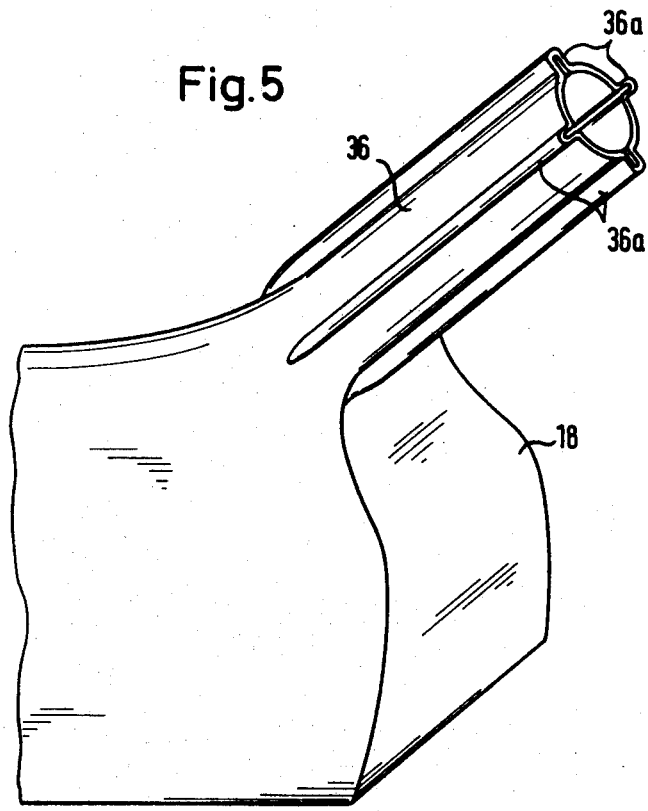
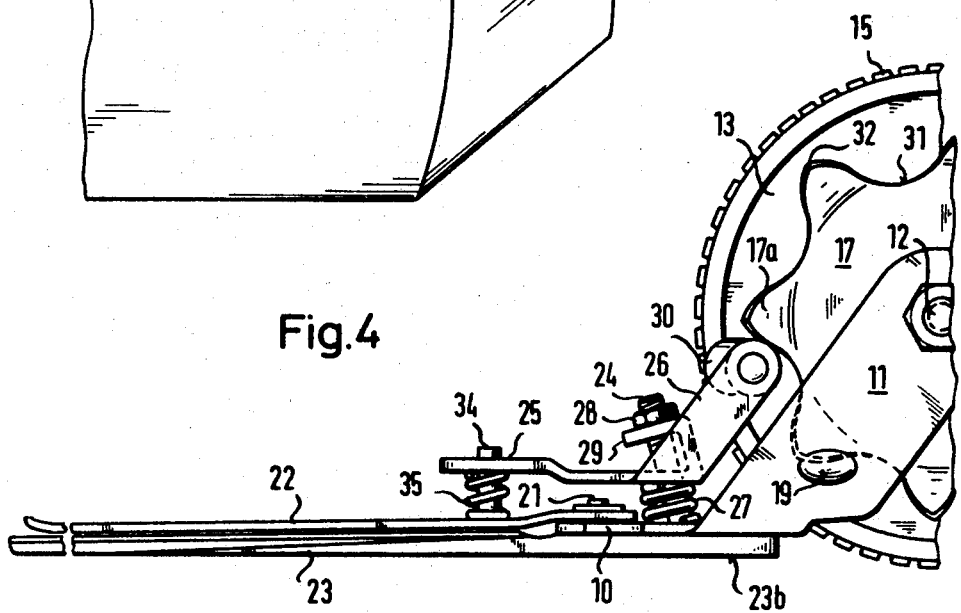

LAWN CUTTING DEVICE IN PARTICULAR LAWN EDGE CUTTER

The present invention relates to a lawn-mowing machine, in particular to a lawn edge cutter, with a mowing device, which is equipped with an inclined upright extending handle for a slide movement of the device, and which in addition is further equipped at the front side with a cutting tool, consisting of an immovable lower blade and an oscillatingly driven top cutter cooperating with the lower blade.

Lawn mowing machines, in particular lawn-edge cutters of the above described type are known in many different types. Among others, a lawn mowing machine has been known, which, runs on wheels and is equipped with a cutting tool, and a top cutter reciprocates cutting to one side on a lower blade. The driving movement of the top cutter takes place by the same hand of the operator, which has to operate also the cutting tool.

Aside from the fact, that this type of service is extremely fatiguing, because the machine must not only be pushed, but must be operated with the same hand continuously, such known cutting device has not produced satisfactory results.

In recognition of the drawbacks inherent in the known lawn mowers, it is one object of the present invention to provide a lawn mowing machine which avoids the drawbacks thereof.

It is another object of the present invention to provide a lawn mowing machine, wherein as a moving device there is provided a single driven cylinder, and laterally adjacent to the cylinder is at least one, and preferably two, on both sides, a cam disc, and in an arrangement of set-off cam divisions relative to each other. The cam disc has control curves provided therearound which cooperate with control rollers of a pivot plate, which is driven oscillatingly by the cam disc and mounted on a pivot axle fixed to the base frame, and being at least double-armed, and capable of being rotated and tipped and extending, however, not exclusively vertically. The pivot plate surrounds, outside of its pivot axle, on the side remote from the control rollers, a driver rigidly connected with the top cutter mounted at one end for swinging and supported adjustably on the top cutter, and is supported by means of a spring wound about the driver, with control of the cutting pressure and adjustably on the top cutter.

The decisive difference of the mowing machine of the present invention relative to the known lawn edge cutter resides in the fact that the present cutting machine is equipped with a multi-function-operating cylinder, which serves on the one hand the purpose of renders the machine rollable, and on the other hand, it automatically causes an oscillating driving movement to the top cutter merely by pushing the machine.

It is particularly emphasized, that the driving movement of the top cutter, can also take place, in another embodiment, for example, by an auxiliary motor. Simultaneously also the running cylinder can be subjected to movement thereby. It is important, however, that the oscillating driving movement of the top cutter is produced by a cam disc control of the cylinder.

Also the lawn mower machine gains an importance, with each cutting stroke of the top cutter automatically wherein the required cutting pressure is exerted on the top cutter, which is brought about by the at least partly inclined arrangement of the control cams, of the control rollers and the position and arrangement of the pivot axle of the pivot plate capable of being tipped, as well as finally by the resilient support of the pivot plate on the top cutter.

A further advantageous feature of the present invention is to be seen in the fact, that a cutting fork is used as a lower cutter, which cutting fork is equipped merely on the inner sides of its fork arms with cutters, which serve as counter-cutters for the edges of the top cutter being sickle-like bent upwardly at the free end. In this manner the mower machine is in the position to cooperate always with a counter-edge of the cutting fork during each performed cutting stroke. With such cutting fork, with which only one double-edge top cutter, cooperates, in the practice an extremely reliable working is made possible. With the present device an aimed cutting is possible. Also the lawn is essentially more uniformly shortly cut by means of the cutting tool consisting of a cutting fork as a lower cutter and a single driven top cutter, than with the known cutting tool. By the upwardly drawn free end of the top cutter also no stitch damages of the lawn can be caused any more. It slides without resistances over the lawn.

To obtain an automatic cutting pressure adjustment of the top cutter to the counter-edges of the lower cutter, all control cams of the cam disc from the lowermost cam position to the highest cam point extend slightly bow-shaped outwardly, so that the closer the control roller of the pivot plate comes to the cam point, automatically an increased pressure is exerted on the pivot plate which is mounted for tipping, and thereby, is transferred to the top cutter.

An inclined arrangement of the control rollers is of advantage in view of the rolling off of the control cams on the side of the control cam discs. In addition, the drive becomes thereby desirably easy.

Finally, the pivot plate is in position, to cooperate with its control fork with both control cam discs disposed laterally adjacent the cylinder. Furthermore, it is achieved with the resilient support, that a yielding support is created, such that foreign bodies enter between the edges of the top cutter and the cutter fork. Thus, foreign matter cannot interfere with the function of the cutters.

It is also advantageous, that the low cutter forming a cutting fork is bipartite, whereby each fork arm is in itself connected with the basic frame, so that thereby not only each cutter arm can be worked easier, rather also the possibility of exchange or of afterworking of one of the two fork arms remains assured.

In this connection it is likewise of importance, that the cutter fork is supported on the bottom side by means of undercarriage skids open in upward direction, disposed outside of its edges, extending in longitudinal direction of the edge arms near the outer edges, and formed by arm deformation.

This support with undercarriage skids of the cutter fork on the bottom over a groove open in upward direction warrants, that during sliding of the cutter fork over the ground, no cutting into the lawn and the soil, respectively, from above by sharp edges can occur.

With these and other objects in view which will become apparent in the following detailed description, the present invention which is shown by example only will be clearly understood in connection with the accompanying drawings, in which:

FIG. 4 is a side elevation of the device, the protection cap being removed; and

FIG. 5 is a fragmentary perspective view of the protection cap.

Figure 1:
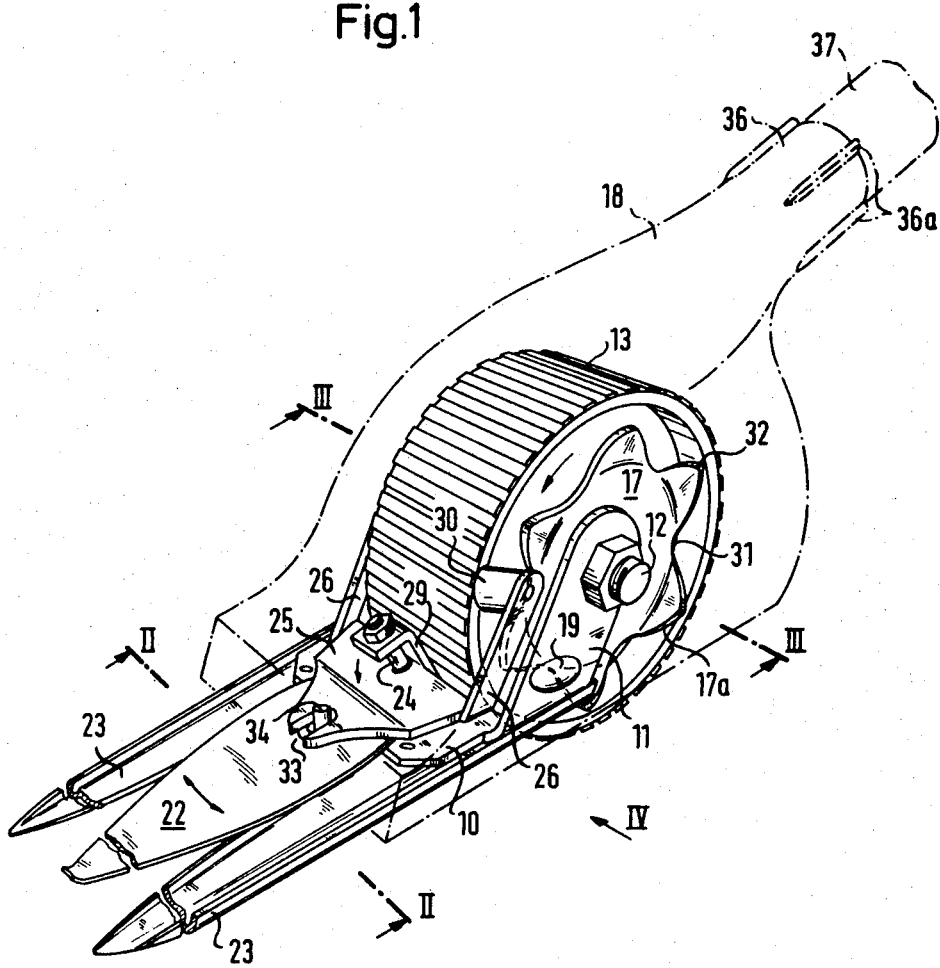
FIG. 1 is a perspective side view of the machine designed in accordance with the present invention.

Referring now to the base frame 10 which is of angular shape in a longitudinal section, which has connected to a substantially plane plate portion, an inclined upwardly extending bearing fork 11. A bearing axle 12 is received in the latter, on which is mounted a turning cylinder 13, which in the present embodiment is formed in two parts which are connected together by coupling cams 14 engaging into complementary recesses. On the outside of the cylinder 13 there is provided a rubber ring 15. Each cylinder part has a cam disc 17 disposed laterally next to a stay 16 disposed in a radial plane. The cam disc 17 is integral with the cylinder half parts. In addition, a protection cap 18 is mounted on the bearing axle 12, which cap 18 is secured in position by securing means 19 and 20. The base frame can have a projection 19 as the securing means, which enters a complementary recess 20 on the inner side of the protection cap.

An upper cutter 22 is mounted on a plate portion of the base frame 10. The cutter 22 is of sickle-shape at an upwardly bent free end thereof and is rotatably mounted on the upper side of the base frame 10 about an axle 21. On the underside of the base frame 10, a lower cutter forming a cutter form 23 is immovably disposed. In addition, in the present embodiment, given by example, a vertically inclined pivot axle 24 is provided on the base frame 10, which pivot axle can, however, also stand exactly vertical. A pivot plate 25 having a bearing fork 26 is tiltably and rotatably mounted about the pivot axle 24. The pivot plate 25 is supported on the side of the plate of the base frame by a spring 27, and is secured by a nut 28 of the pivot axle which supports itself on the upper side of a securing angle 29 through which the pivot axle extends.

Control rollers 30 which are directed inwardly from the bearing fork 26 are disposed on the bearing fork 26 of the pivot plate 25. The rollers 30 are disposed in a horizontal plane in a direction inclined toward the pivot axle of the bearing fork and laterally press the turning pivot cylinder 13 and are disposed in the range of the cam discs 17. The two cam discs 17 are formed star-like and are arranged set off with respect to each other for a half star or cam division 17a. (compare the discs 17 in FIG. 2) The cams 17a of the cam disc run from their deepest location 31 to their highest cam apex 32, which is outwardly directed. The inclination of each control roller cam is about 10°.

The pivot plate 25 has on its plate-shaped part, a one-sided open control groove 33, which surrounds a driver 34 which is rigidly secured to the upper cutter 22. A pressure spring 35 is secured about the driver 35, by means of which the pivot plate 25 is supported on the upper cutter 22 adjustably to the cutting pressure.

Figure 2:
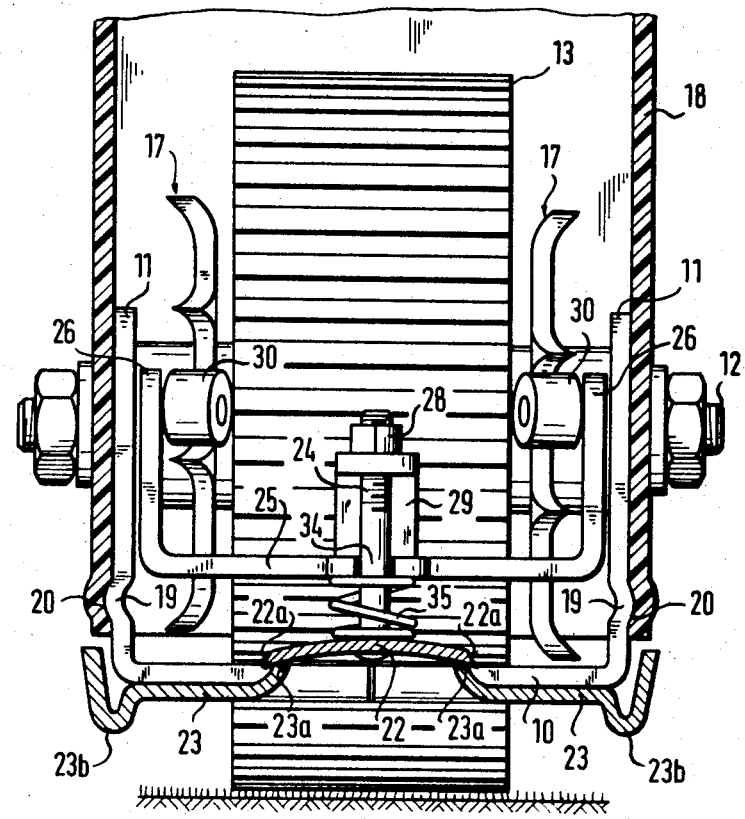
FIG. 2 is a section along the lines II—II of FIG. 1.
Figure 3:
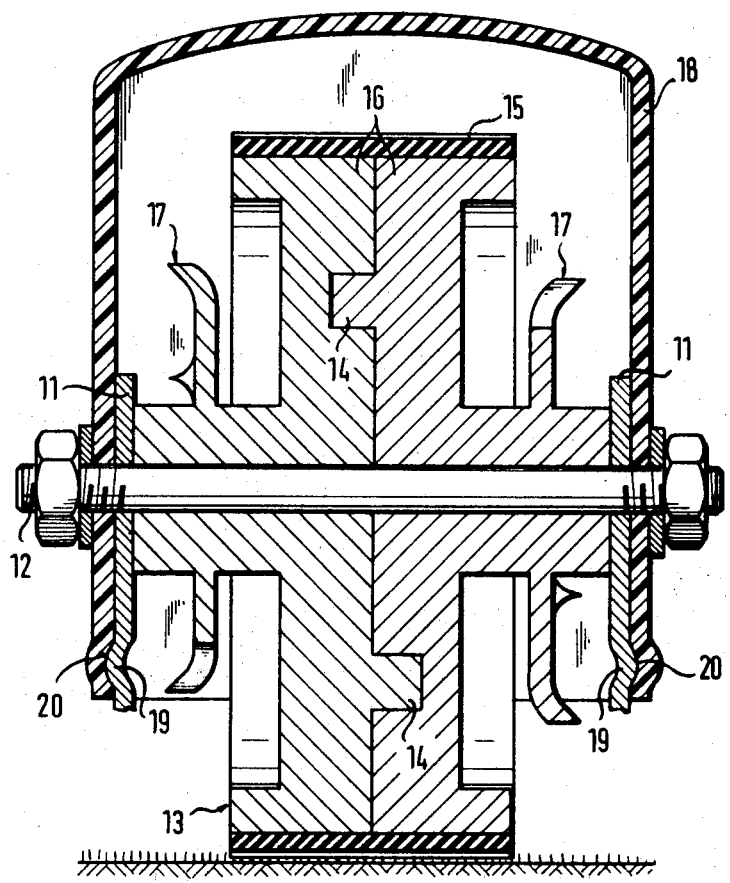
FIG. 3 is a section along the lines III—III of FIG. 1.

The upper cutter 22 is bent upwardly at its end point, and is designed convex in cross-section, as apparent from FIG. 2 and forms cutting edges 22a on both side edges. The edges 23a of the lower cutter fork 23 are drawn upwardly in the direction towards the edges 22a. Laterally therefrom, each arm of the lower cutter fork forms undercarriage skids 23b, which are open upwardly.

The protection cap 18, which can be, by example, blow-molded of synthetic material, and which covers the entire device, has at its upper rear end, an integrally formed insert sleeve 36, into which a service rod 37 is self-clampingly inserted for a slide operation of the device. The sleeve insert opening is smaller than the thickness of the rod. In addition the sleeve is elastic under tension and stiffened by hollow ribs 36a.

During the sliding operation of the device, the rotary movement exerted on the turning cylinder 13 is transformed into a cutter driving movement such, that the simultaneously rotating cam discs operate, via the control cams 17a, the inclined control rollers 30 of the bearing fork 26 of the pivot plate 25, which in turn moves, by means of the control groove 33, the driver 34 of the upper cutter corresponding with the exerted movement of the pivot plate, so that a cutting stroke of the upper cutter 22 is exerted, such that the edges 22 cooperate with the complementary edges 23a of the lower cutter fork. By the relatively displaced cam arrangement of the two cam discs, an oscillating driving movement of the upper cutter is obtained, and in addition, a cutting pressure adjustment is obtained automatically by the design of the control cams and the tilting mounting of the pivot plate 25, in combination with the resilient pressure transfer onto the top cutter.

It is understood that the shown and described embodiment is to be considered merely as a possible example for the practical realization of the present invention, which is not limited thereto. Within the framework of the present invention, some embodiments are possible in particular concerning the drive transmission from the roller to the top cutter, which, however, as much as they perform a multiple function of the running roller in the sense of a forward movement of the device and of the cutter drive, are considered as a part of the present invention.

While I have disclosed one embodiment of the present invention, it is to be understood, that this embodiment is given by example only and not in a limiting sense.

I claim:

1. A lawn mower machine, in particular a lawn edge cutter, comprising:
   a base frame secured to a bearing axle,
   an immovable fork-shaped lower knife mounted immovably to said base frame,
   an upper knife means for cooperating with said lower knife being pivotally connected to said base frame,
   a rotatable roller rotatably mounted on said bearing axle in said base frame behind said upper knife means and longitudinally arranged in said base frame and adapted to roll in the ground,
   a lateral cam disc integrally connected to said rotatable roller on each side thereof and coaxially spaced therefrom for joint rotating movement therewith and each having a control curve constituting an undulating cam shaped peripheral edge, and said undulating cam shaped peripheral edges of said cam discs are phase off-set with respect to each other,
   a control fork means resiliently and tiltingly pivotally supported at a first pivot axle on said base frame in front of said rotatable roller and having a pivot plate and two lateral arms each extending rearwardly from said pivot plate on lateral sides of said rotatable roller, a roll disposed on each lateral arm and rollingly engaging one of said control curves, and said rolls disposed in a horizontal plane and extending inclined from said lateral arms toward said first pivot axle, said first pivot axle being inclined upwardly slightly from the vertical in a direction away from said rolls, said pivot plate forms a control slot, a driver member disposed in said control slot and rigidly connected with said upper knife means, a spring wound about said driver member between said pivot plate and said upper knife means and supporting said pivot plate adjacent to said driver member, thereby providing for adjustment of a cutting pressure, and, a protective cap arrestably and swingably disposed about said roller and said bearing axle and including an integral insert sleeve adapted to receive a pusher means, whereby, a pushing of said machine effects a rolling of said rotatable roller and a turning of said control curves which cooperatively oscillatingly pivots said control fork about said first pivot axle via said rolls, and said control fork in turn oscillatingly pivoting said upper knife means effecting a cutting cooperation with said lower knife.

2. The lawn-mowing machine, as set forth in claim 1, wherein:
said lower knife has two cutting arms forming inside disposed side cutting edges, and
said upper knife means includes cutting edges on lateral sides which cooperate exclusively with said inside disposed side cutting edges of said lower knife.

3. The lawn mowing machine, as set forth in claim 1, wherein:
said rotatable roller constitutes a cylinder formed of two cylinder halves which are coupled by inner, axially directed drivers to joint rotation, and
said lateral cam discs form an integral structural unit with each cylinder half and set off relative to each other for a half of an undulating cam portion.

4. The lawn mowing machine, as set forth in claim 1, wherein:
said control curves of said cam discs extend from a lowermost cam location to a highest cam point slightly convex outwardly, for obtaining an oscillating movement of said upper knife means as well as an automatic cutting pressure adjustment therefor.

5. The lawn mowing machine, as set forth in claim 1, wherein:
said base frame is angular shaped in a longitudinal section, and includes a plate part and an upwardly directed bearing fork for reception of said bearing axle which follows said plate part, and
a cutter-bearing axle disposed on said plate part in front of said first pivot axle of said pivot plate for pivotally mounting said upper cutter means.

6. The lawn mowing machine, as set forth in claim 1, wherein:
said lower knife forms a cutter fork with fork arms and is bipartite, and each fork arm is independently connected with said base frame.

7. The lawn mowing machine, as set forth in claim 1, wherein:
said upper knife means is bent upwardly sickle-like and convex at a free end point over its total cross-sectional width, and said lower knife having a cutter range on the side complementary to that of said upper knife means and extending upwardly to edges of said upper knife means.

8. The lawn mowing machine, as set forth in claim 1, wherein:
said lower knife is formed as a cutter fork having cutter arms and is supported on the bottom side by under carriage skids open upwardly
and formed by arm deformation outside of its edges and extending in longitudinal direction of said cutter arms close to the outer edges.

9. The lawn mowing machine, as set forth in claim 1, wherein:
said protective cap is equipped with rest projections in an over-gripping range on the side of said base frame,
said rest projections cooperating arrestingly with complementary projections and recesses, respectively, and wherein
said integrally formed insert sleeve has an open cross-sectional width smaller than the cross-section of said pusher means and is designed with radial hollow ribs tension elastically and stiffened, and said hollow ribs are disposed divided about said sleeve.

10. The lawn mower machine, as set forth in claim 1 wherein:
said lower knife is formed fork-shaped and said upper knife means is double-edged.

* * * * *